United States Patent [19]

Uecker et al.

[11] Patent Number: 4,838,038

[45] Date of Patent: Jun. 13, 1989

[54] TEMPERATURE INSULATING APPARATUS FOR IMPROVING THE EFFICIENCY OF AN EVAPORATIVE COOLING UNIT

[76] Inventors: Dale A. Uecker, 10011 N. 40th Dr., Phoenix, Ariz. 85051; Keith R. Boltz, 4470 N. Bonanza, Tucson, Ariz. 85749

[21] Appl. No.: 142,706

[22] Filed: Jan. 11, 1988

[51] Int. Cl.$^4$ .............................................. F28D 5/00
[52] U.S. Cl. ..................................... 62/304; 62/259.4; 62/298
[58] Field of Search .............. 62/304, 259.4, DIG. 13, 62/DIG. 16, 298

[56] References Cited

U.S. PATENT DOCUMENTS 4,732,012 3/1988 Thorpe ................................... 62/304

Primary Examiner—Henry A. Bennet
Attorney, Agent, or Firm—Jordan M. Meschkow; Don J. Flickinger

[57] ABSTRACT

Disclosed is an apparatus and method of improving the efficiency of an evaporative cooling unit by shielding the unit from solar originated heat. The apparatus generally consists of a piece of insulating material bounded on at least the upper surface thereof by a light-reflecting material and being detachably coupled above the evaporative cooling unit.

2 Claims, 1 Drawing Sheet

TEMPERATURE INSULATING APPARATUS FOR IMPROVING THE EFFICIENCY OF AN EVAPORATIVE COOLING UNIT

BACKGROUND OF THE INVENTION

1. Field of the Invention

The present invention generally relates to an apparatus and method for permitting evaporative cooling units to operate more efficiently and, more specifically, to an apparatus and method for lowering the temperature of the air generated by an evaporative cooling unit comprising an insulating member including an upper layer to reflect light rays emanating from the sun mounted on the top of the evaporative cooling unit.

2. Description of the Prior Art

In the past, various systems were developed to retain heat within a certain container or to reflect sunlight onto solar energy gathering panels, etc., and various methods were created to carry out heat retention or light reflection tasks. In particular, there was a distinct need to develop an apparatus and method to improve the efficiency and operation of evaporative coolers which resulted in developing a device to shield a critical portion of an evaporative cooling unit from direct exposure to the sun's rays and thereby reduce the temperature within the cooling unit consequently lowering the temperature of the processed air exiting therefrom.

For example, Thomason (U.S. Pat. No. 3,254,643, issued June 7, 1966) discloses a solar heat apparatus. The Thomason apparatus is intended to convert incoming solar rays into heat and to trap the converted heat. Basically, Thomason teaches a system including a solar ray receiving section and a hinged reflecting section for directing the solar rays onto the surface of the receiving section for increasing the intensity of the sun light to the receiving section.

Miller et al. (U.S. Pat. No. 4,530,441, issued July 23, 1985) teach an insulating cover for a heated metal container. Intended to retard radiant and conductive heat loss from the containers, the Miller et al. cover is contemplated to fit over container into which molten steel or aluminum has been poured.

The Zehnder reference (U.S. Pat. No. 2,661,974, issued Dec. 8, 1953) discloses a garbage can cover lock. The locking device taught by Zehnder is to hold covers used on large garbage, feed and ash cans. To use the Zehnder lock, a person must extend the elongated flat bar through the handle on the trash can lid and then the flat bar is coupled to the handles affixed to the side walls of the trash can.

Akin to Zehnder, Remig (U.S. Pat. No. 3,363,924, issued Jan. 16, 1968) reveals a device for holding covers on garbage cans and the like. Remig teaches two endless rubber straps each forming a loop to which a hook-type device is attached. The rubber loops of Remig are tied around the handle on the trash can lid before the hooks are secured to the can handles thereby holding the cover in place.

None of the references cited above are concerned with shielding and insulating an evaporative cooling unit from solar rays and corresponding heat. Evaporative cooling systems operate on a relatively simple process whereby air is forced through porous pads which have a flow of water running therethrough. When the unprocessed air is passed over the water, the evaporation of the flowing water cools the air which is then forced into the space to be cooled. Since evaporative coolers are most effective when the incoming air is relatively dry, these cooling systems are used mostly in arid climates during periods of hot weather.

The majority of evaporative cooling units are designed to be installed on the roof of the building or space to be cooled and usually include a structure constructed of metal materials. Naturally, the temperature of the metal material is significantly raised when the sun's rays strike the roof of the cooling unit. Obviously then, the evaporative cooling system can not operate at maximum efficiency when the cooling unit is being heated by the sun. It is exactly this heating problem which the present invention addresses.

SUMMARY OF THE INVENTION

It is an object of this invention to provide an apparatus and method for permitting evaporative cooling units to operate more efficiently.

It is a further object of this invention to provide an apparatus and method for lowering the internal temperature of an evaporative cooling unit thereby reducing the temperature of the air exiting the unit into the space to be cooled.

It is a still further object of this invention to provide an apparatus and method for improving the efficiency of an evaporative cooling unit which is easily installed without tools and which requires no modification of the cooling unit.

It is another object of the present invention to provide an apparatus and method for improving the efficiency of an evaporative cooling unit which is of relatively simple construction and which can be manufactured at reasonable costs.

The foregoing and other objects, features and advantages of this invention will be apparent from the following, more particular, description of the preferred embodiments of this invention, as illustrated in the accompanying drawings.

DESCRIPTION OF THE PREFERRED EMBODIMENT

Figure 1:
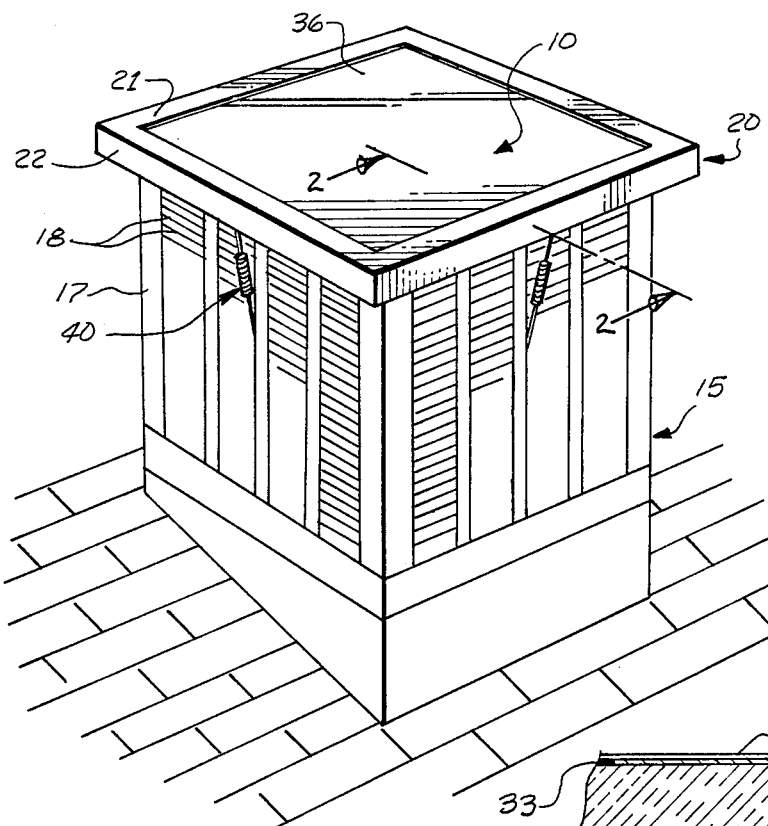
FIG. 1 is a perspective view of the present invention installed over an evaporative cooling unit.

Referring now to FIG. 1 of the accompanying drawings which set forth the present invention in greater detail and in which like numerals designate like features, the temperature insulating apparatus 10 is horizontally positioned above an evaporative cooling unit 15. It is understood that the insulating apparatus 10 may extend beyond each of the side walls of the cooling unit 15 creating an overhang to further insulate the unit 15 from heat causing solar rays.

The temperature insulating apparatus 10 includes an upper reflective layer 36 disposed above a piece of rigid insulation material 30 (See FIG. 2) and is circumferentially surrounded by a rim member 20. The rim member 20 is composed of an upper portion 21, an outer portion 22, and a lower portion 23 (See FIGS. 2 and 3), and according to one embodiment of the present invention, is constructed of galvanized sheet metal. Connecting springs 40 provide detachable coupling between the temperature insulating apparatus 10 and the evaporative cooling unit 15. One embodiment of the present invention includes four connecting springs 40 each attached to a fin 18 on a different louver panel 17, the panels 17 comprise the four vertically oriented sides of the cooling unit 15 and through which the incoming air enters the evaporative cooling system.

Figure 2:
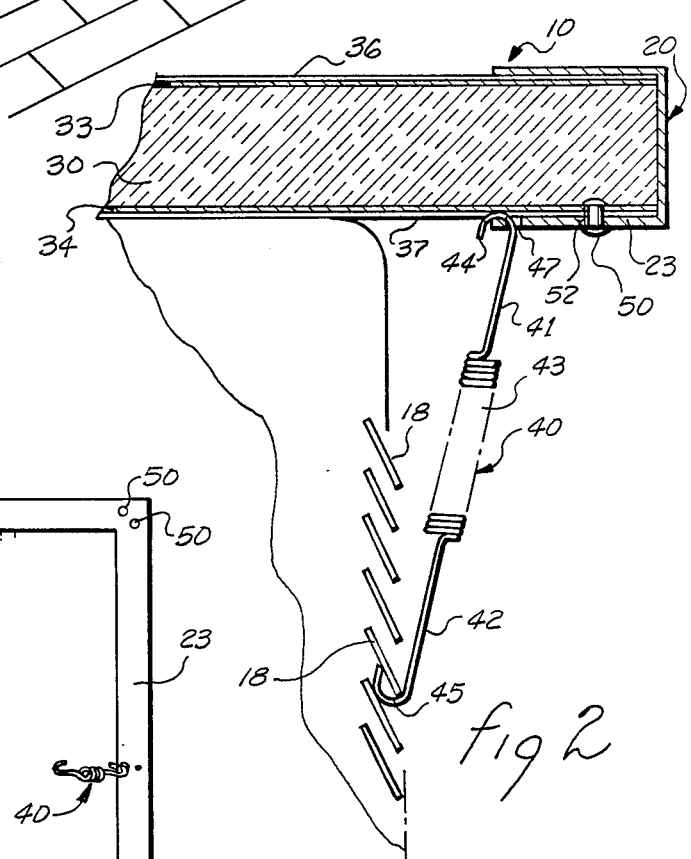
FIG. 2 is a partial cross-sectional view taken along the line 2—2 of FIG. 1.

As best illustrated in FIG. 2, a horizontally oriented piece of rigid insulation 30, such as urethane or the like, forms the core of the temperature insulating apparatus 10. In one embodiment, the rigid insulation 30 is covered on the bottom and top sides thereof by a lower fibrous paper layer 34 and an upper fibrous paper 33, respectively. In turn the upper and lower fibrous paper layers 33 and 34 are covered by respective upper (36) and lower (37) reflective layers. Ideally, the insulating apparatus 10 extends beyond the sides of the cooling unit 15 creating an overhang to better shield the upper portion of the cooling unit 15 regardless of the angle of the sunlight.

In an embodiment of the present invention, the reflective layers 36 and 37 are composed of a white reflective coating applied to the fibrous paper layer 33 and 34. It should be understood that the reflective layers 36 and 37 may be composed of any material which effectively reflects light rays emanating from the sun.

The rim member 20 may be comprised of a u-shaped member having the open side oriented toward the center of the rigid insulation 30. One embodiment of the present invention includes a rim member constructed of galvanized sheet metal or similar materials. Holes 47, for accepting an upper hooked portion 44 of the connecting spring 40, are located on the lower portion 23 of the rim member 20. The upper hook portions 44 are displaced through the holes 47 and back down over the interior edge of the lower portion 23 of the rim member 20.

The upper hook portion 44 is integral with an upper member portion 41 of connecting spring 40, which is in turn integral with a coiled portion 43 of the connecting spring 40. In a similar fashion, the coiled portion 43 is integral with a lower member portion 42 which is integral with a lower hook portion 45 of the connecting spring 40. The lower hook portion 45 of the connecting spring 40 is detachably coupled to a fin 18 of the louver panel 17. The connecting spring 40 may be constructed of stainless steel or other non-corrosive resilient material.

As also illustrated in FIG. 2, pop-type rivets 50 may be employed to hold the rim member 20 constant relative to the rigid insulation 30 and the outer layers thereof 33, 34, 36 and 37. Holes 52, in the lower portion 23 of the rim member 20, accommodate the rivets 50 which may be of a non-corrosive material. It is understood that one embodiment of the subject invention comprises a reversible insulating panel so that if the upper reflective layer 36 has been discolored or otherwise rendered less reflective, the piece of rigid insulation 30 may be turned over so that the lower reflective layer 37 is disposed in place of the upper reflective layer 36, and vice versa. It is also understood that a certain R factor is required of the rigid insulation 30, therefore the thickness thereof should be at least one inch or greater. In one embodiment of the subject invention, two inch thick urethane insulation board is used which has an R factor of 13.4.

Figure 3:
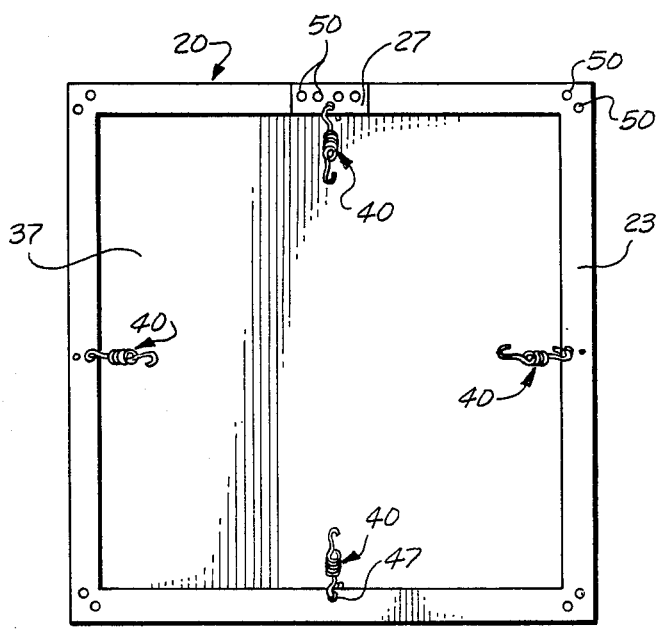
FIG. 3 is a bottom view of the present invention.

As depicted in FIG. 3, the rim member 20 may be formed of a single piece of u-shaped material and joined end to end by a coupling member 27. The coupling member 27 is also u-shaped and fits directly around the two ends of the rim member 20 so that the coupling member 27 provides a bridge connection with rivets 50 to hold the ends of the rim member 20 in place.

SYSTEM OPERATION

The installation of the temperature insulating apparatus 10 is relatively simple. The apparatus 10 is positioned on the roof of the evaporative cooling unit 15. The connecting springs 40 are then attached to appropriate fins 18 of the louver panels 17 of the cooling unit 15 to secure the apparatus 10 in the desired position.

As the solar rays strike the upper reflective layer 36 a great portion of the rays are reflected upwardly and away from the cooling unit 15. Only the rays which are not reflected create heat on the upper reflective layer 36, but the cooling unit 15 is insulated from this radiant heat by the rigid insulation 30 and the fibrous paper layers 33 and 34.

Accordingly, when the temperature insulating apparatus 10 is employed, the inner temperature of the cooling unit 15 is significantly reduced which is critical to the efficient operation of the evaporative cooling system. Preliminary tests have shown a reduction of as much as six degrees Fahrenheit in the temperature of the processed air when the subject insulating apparatus 10 is used compared to the same unit without the insulating apparatus 10.

While the invention has been particularly shown and described in reference to the preferred embodiments thereof, it will be understood by those skilled in the art that changes in form and details may be made without departing from the spirit and scope of the invention. For example, it is understood that the subject invention may be used in conjunction with all types of cooling units including air conditioning compressors and the like.

I claim:

1. Apparatus for improving the efficiency of an evaporative cooling unit having a top and side louvre fins, said apparatus including:
   (A) a unitary multi-layer insulating/reflecting assembly positioned above said evaporative cooling unit, said insulating/reflecting assembly comprising:
     1. an insulating core of rigid-type thermal insulating material having a thickness of at least one inch, said insulating core having top and bottom surfaces;
     2. a first intermediate fibrous paper layer covering said top surface of said insulating core;
     3. a second intermediate fibrous paper layer covering said bottom surface of said insulating core;
     4. a first outer reflective layer covering an outwardly facing surface of said first fibrous paper layer;
     5. a second outer reflective layer covering an outwardly facing surface of said second fibrous paper layer; and
     6. a circumferentially encompassing rim member for providing structural integrity; and
   (B) coupling means for detachably securing said insulating/reflecting assembly to said evaporative cooling unit, said coupling means comprising:
     (1.) a plurality of circumferentially distributed holes in said rim member; and
     (2.) a plurality of spring-type connectors, each said spring-type connector including:
       a. an upper hook portion;

b. a lower hook portion; and c. a spring portion intermediate said upper and lower hook portions;

such that said insulating/reflecting assembly may be detachably and reversibly secured to the top of said evaporative cooling unit by individually inserting said upper hook portions of said connectors into said holes in said rim member, stretching said spring portions of said connectors and connecting said lower hook portions of said connectors to louvre fins of said evaporative cooling unit.

2. The efficiency improving apparatus of claim 1 in which said first and second outer reflective layers comprise, respectively, first and second white reflective coatings applied to said outwardly facing surfaces of said first and second fibrous paper layers.

* * * * *